Aug. 3, 1948. F. D. MERRILL, JR 2,446,428
APPARATUS FOR PRODUCING INDICATIONS
OF MOVEMENT OF AN ELEMENT
Filed Nov. 3, 1944 2 Sheets-Sheet 2

INVENTOR.
FREDERIC D. MERRILL Jr.
BY
H.S.Grover
ATTORNEY

Patented Aug. 3, 1948

2,446,428

UNITED STATES PATENT OFFICE 2,446,428

APPARATUS FOR PRODUCING INDICATIONS OF MOVEMENT OF AN ELEMENT

Frederic D. Merrill, Jr., Orange, N. J., assignor to Radio Corporation of America, a corporation of Delaware Application November 3, 1944, Serial No. 561,670

5 Claims. (Cl. 177—351)

1

This application relates to means for producing at one point indications of movement of an element at another point, and in particular to radio and electronic apparatus for recording or indicating visually or aurally continuously or occasionally movement of an element such as the pointer of a voltmeter or ammeter used in radio or electronic apparatus at some distant point which may not be readily supervised or accessible. For example, radio and electronic apparatus is sometimes employed at inaccessible locations where the presence of a supervisory operator is not practical. Lighthouses, relay stations, booster power stations, mountain top weather stations, fire control stations, water level control, etc., are examples of places where radio circuits and apparatus may be used and may include meters or gages such as water gages which provide indications of operation thereof, at which stations it is impracticable to keep a supervising operator continuously.

In considering the problem I have assumed that a radio transmitting system or a wire line system may be used to transmit current characteristic of the meter deflection information to a more conveniently located station.

An object then of my invention is improved means for transmitting indication of movement of a member from one point to a second point.

A more specific object of my invention is an improved means for transmitting current representative of movement of a member such as a meter pointer from one point to a second point and then utilizing said current at the second point in an improved manner to produce an indication of the movement of the said meter pointer at said one point.

Figure 1:
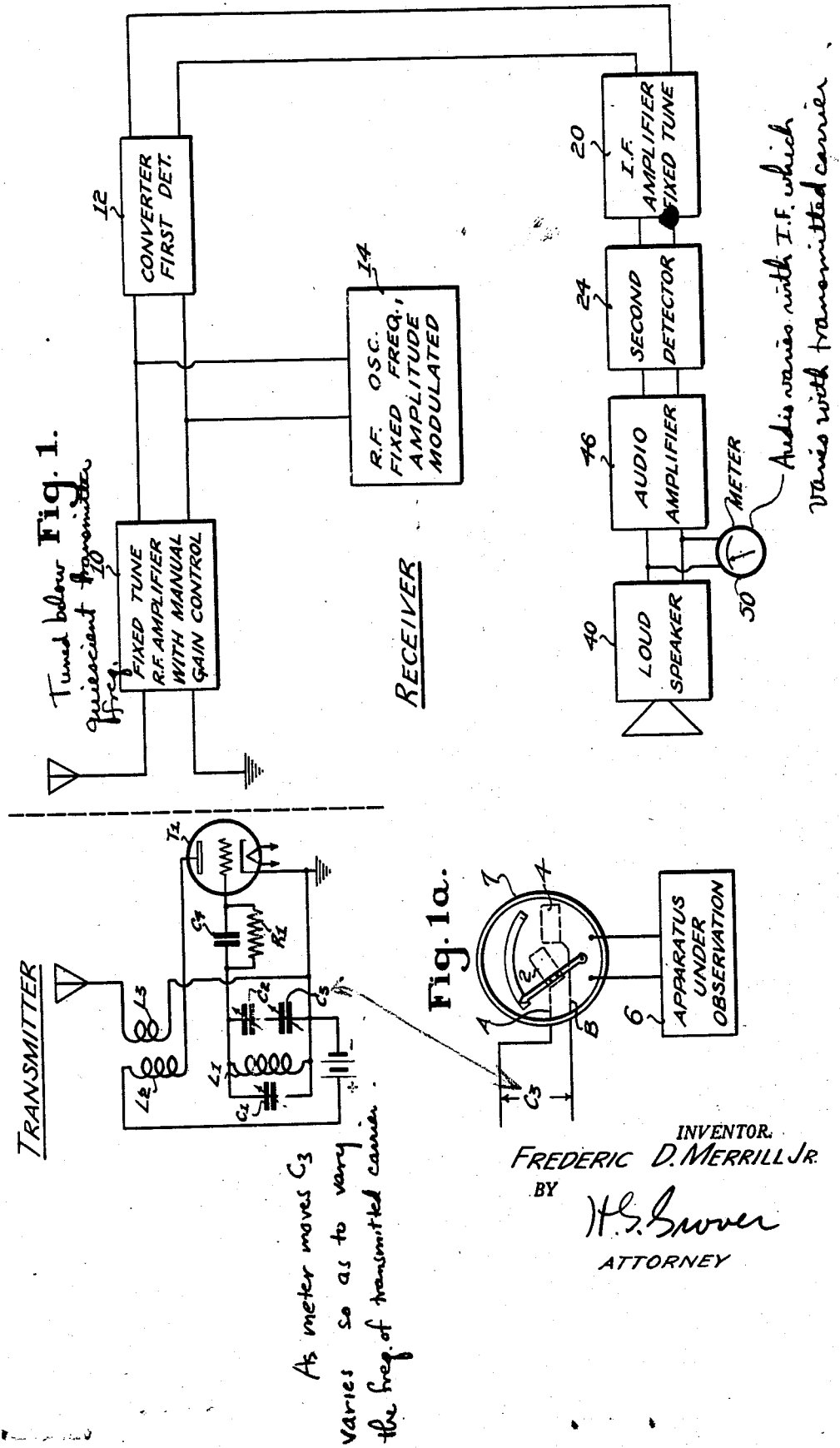

The advantages derived by attainment of the objects enumerated above and other objects and advantages will appear from the detailed description which follows. In this description reference will be made to the attached drawings wherein Figs. 1 and 1a illustrate a system for transmitting indications of movements of a member from one point to another arranged in accordance with my invention. In Fig. 1 at the left is a transmitter, which may be located in an inaccessible position, to be controlled by movement of the member and to send out wave energy of a frequency which changes when the element moves. The receiver

2 shown at the right of Fig. 1 is located at a point where the observations are to be made. The elements of the receiver may be conventional and the same have been shown by rectangle.

Figs. 2 to 6, inclusive, illustrate details of the means used at the transmitter of Fig. 1 for varying the frequency of the transmitted energy when the meter hand moves.

An ordinary voltmeter or ammeter or other deflecting instrument 4, Fig. 1a, is included in operating circuits, not shown (but included in rectangle 6), to be observed from the remote point. The instrument is provided with an additional pair of terminals A and B connected to plates 2 and 4. The capacity between these plates varies in some manner with the deflection of the meter hand. The capacity alters the frequency of the radio transmitter at the left of Fig. 1. In Figs. 1 and 1a the capacity is designated as C3, and changing this capacity C3 alters the frequency generated by the regeneratively coupled tube T1. A radio receiver shown at the right of Fig. 1 is fixed tuned below the quiescent frequency of the transmitter, i. e., to the frequency at which the transmitter generates oscillations with no meter deflection. When the meter deflects, the capacity C3 in the meter changes, for example, increases. Where the capacity increases the transmitter frequency diminishes and the carrier voltage at the radio receiver increases. This is because since the frequency of the transmitter has decreased it is nearer or at the frequency to which the receiver is tuned. If the meter deflection is assumed relatively constant now, the generated frequency will be relatively constant and an ordinary receiver will provide no audio output since the carrier is not being continuously modulated. In accordance with my invention modulation could be provided at the transmitter, but to simplify the transmitter, there are advantages in providing the modulation in the receiver. I make use of a receiver of the heterodyne type as shown in Fig. 1, and I amplitude modulate the heterodyning oscillator 14 of this receiver to modulate the intermediate frequency obtained by beating the oscillations with the incoming signal. The oscillations developed in 14 are preferably modulated by oscillations of audio or tone frequency. The amount of amplitude modulation of the local oscillator may be fixed. The amplitude of the intermediate frequency signal depends on how closely the frequency difference between the incoming carrier amplified in 10 and the fixed radio frequency of the local oscillator developed in 14 approaches the resonant frequency of the intermediate frequency amplifier stages 20 following the converter and first detector 12. With the meter deflected perhaps full scale, the difference between the local oscillator frequency and the carrier frequency approaches a beat frequency of the desired intermediate frequency to which the I. F. amplifier 20 is tuned. The amplitude of the signal output of the amplifier 20 then depends on the selectivity of 10 and of 20 or one or the other thereof. The audio or tone frequency output from the second detector 24 and the following output stage is now at maximum in the loudspeaker 40. The value of the audio frequency output voltage is observed with a copper oxide rectifier voltmeter, or with a D. C. milliammeter if the vacuum tube voltmeter method is used. Such a meter is shown at 50. In either case the meter is connected across the audio amplifier 46 output, for example, across the loudspeaker voice coil, thus producing both aural and visual magnitude indications of the strength of the modulation in turn producing indications of the position of the meter hand at the transmitter end of the system. The output of the audio amplifier could be used to adjust the electrical operation of the transmitter at the inaccessible station.

The wave generator and transmitter may be of any approved type provided it includes as a frequency controlling element a reactance C3 which is comprised of the variable reactance in the meter or similar device in the apparatus being monitored or observed at the remote point.

I have shown a preferred wave generator and transmitter at the left of Fig. 1.

The transmitter at the left of Fig. 1 includes a tube T1 in an oscillation generator, oscillating by virtue of the feedback between the coil L2 in the plate circuit of the tube and the coil L1 in the grid circuit of the tube. The variable condenser C1 determines the quiescent operating frequency, i. e., the operating frequency when the value of C3 is a maximum or minimum. The condenser C3 formed by the plates 2 and 4, Fig. 1a, is of a value determined by the meter deflection. C2 in series with C3 determines how much the quiescent frequency is shifted by a change in the capacity in C3. The generated energy is induced in the output coil L3 and the magnetic energy is emitted by the antenna to the receiver end of the system, wire lines may be used to couple the receiver to the output inductance 3 to use my system as in a guided radio wave or wireless system.

The receiver at Fig. 1, as described above, comprises a fixed tuned radio frequency amplifier 10 with manual gain control. As stated above, this amplifier is fixedly tuned to the frequency transmitted from the generator including tube T1 in the quiescent operating condition, i. e., when C3 is maximum or minimum. The amplified radio frequency current is supplied to a first detector and converter 12, wherein it is beat with amplitude modulated oscillations from 14. The fixedly I. F. amplifier 20 supplies energy to the second detector 24 and thence to an audio amplifier 46, and this output goes to a loudspeaker 40 and the meter 50, described above. The amplifier with manual gain control, converter, first detector, modulated oscillator, I. F. amplifier, second detector, audio amplifier, etc., may be conventional circuits, and are so well known in the prior art that a detailed description thereof is not believed necessary here.

The condenser C3 included with the meter may take various forms and in Figs. 2 to 6, inclusive, I have shown some preferred embodiments of the capacity varying elements in the meter, readings of which are to be observed at the received end of the system.

Figure 2:
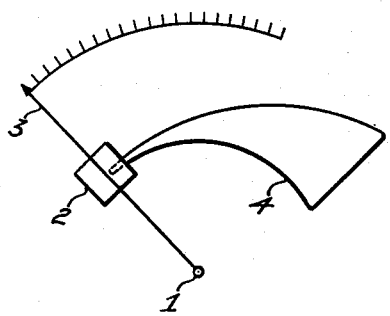

In Fig. 2 a conventional meter pointer 3 is shown as being pivoted at 1. The pointer 3 is arranged over a scale whereon current or voltage readings are taken. The meter has the usual windings and may be included in any circuit under observation at the transmitter end of the system, as described hereinbefore. Under the arrow 3 appears the usual printed scale so that there is not interference with customary meter use. Attached to the needle 3 is the rectangular conducting plate 2, which forms the movable element of the condenser C3. Spaced below the plate 2 is a second conducting plate 4. As the pointer rotates clockwise in accordance with the usual meter deflecting means, the capacity between elements 2 and 4 increases in conformity to the shape of the plate 4, i. e., as the area of the opposing plates increases. For example, it may be desired to cause the meter at 50 to follow the meter at 4. Then the capacity variations are made proportional to meter 4 hand movement by plates such as shown in Fig. 2. The scale divisions on both meters then may be identical. The elements 2 and 4 have leads from the meter case which are connected in the oscillation generator at the left of Fig. 1 to provide the condenser C3.

Figure 3:
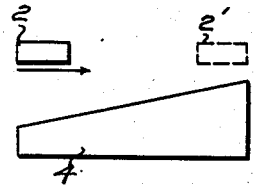

In the embodiment illustrated in Fig. 3, the capacity C3 is varied by virtue of change in distance between the two capacity electrodes 2 and 4. This is to be distinguished from the arrangement of Fig. 2 where the distance between plates is fixed. In Fig. 3 the electrode 2 is movable from a position shown in full lines to a position shown in dotted lines and vice versa. The two positions of the movable electrode 2 are shown at 2 and 2'. This change in capacity may be made substantially proportional to movement of the element 3.

Figure 4:
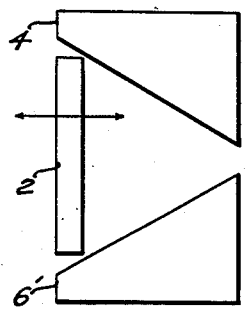

If a direct electrical connection to the movable element represented at 1 in Fig. 2 is not always convenient, two fixed plates 4 and 6' may be used under or adjacent to a movable plate 2, as illustrated in Fig. 4. The electrode 2 is again the moving element and moves from right to left to thereby vary the capacity between the fixed plates 4 and 6'. The electrode 2 may be completely insulated from its moving support so that the only coupling between the electrodes 4 and 6' is by virtue of the capacity between 2 and 6' in series with the capacity between 2 and 4. The connections are now made to the elements 4 and 6', and the capacity between 4 and 6' represents the condenser C3 of the transmitter at the left of Fig. 1.

Figure 5:
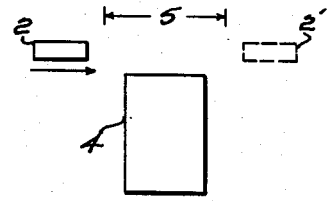

An advantage of my frequency modulation meter is that the electrical output or scale system may be adjusted in any desired manner. In Fig. 5, for example, the output voltage is provided only in the range indicated by 5. No output is given when the movable electrode is in the position 2 or 2', because the capacity is at a minimum and the transmitter accordingly is at its quiescent frequency. If the element 2 is of a dimension small as compared to the dimension 5 then when 2 moves within the dimension 5 there is substantially no change of frequency until this element again passes beyond said dimension.

Figure 6:
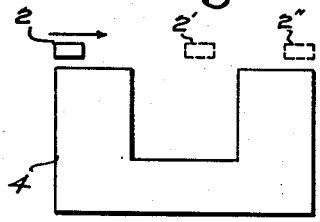

Suppose that a warning audible or visual signal is desired if a voltmeter reading drops either too low or rises too high. Fig. 6 illustrates an arrangement of capacity electrodes to give this result. The electrode 4 has a configuration as shown in Fig. 6. When the meter moving element is located at its correct position, say the movable element 2 is in the position 2', as it would be when connected to the hand of a center scale zero reading meter, the small capacity between 2' and 4 does not shift the transmitter frequency so that the transmitter operates at its quiescent frequency. If the voltage across the meter drops, however, the moving hand and the moving electrode 2 may occupy a new position at 2. The plate separation is now small so that the capacity of condenser C3 is much larger and the transmitter frequency falls since this condenser is in shunt to the inductance L1. This brings the transmitted wave more nearly at the frequency to which the receiver is tuned, resulting in the appearance of the output voltage in the receiver or an increase of the output voltage in the receiver across the loudspeaker or earphones, or at the indicating meter. A similar result occurs if the meter at the transmitter end deflects owing to an over voltage. The capacity element 2 would now take its position at 2'' to again increase the capacity C3 and bring the transmitted frequency towards the frequency to which the receiver is tuned. The shape of the capacity electrodes along with their separation may be adjusted to take care of any non-linearity in receiving system or meter 2 (Fig. 1).

The value of capacity depends on the dielectric constant as well as area and separation of electrodes. For viscosity and similar measurements, the change in dielectric constant can be utilized to determine the value of C3 in Fig. 1. Two electrodes rigidly spaced and of adequate area will give a change in capacity in accordance with dielectric constant changes.

In constructing a meter based on the capacity change principle, the various connecting leads and capacity itself must be adequately electrostatically shielded. The connecting leads would preferably be short and certainly free from motion to prevent spurious capacity changes.

It is evident that means must be provided to prevent drift in the quiescent oscillator frequency and resonant frequencies of the tuned circuits in the receiver. Negative feedback and temperature compensating capacitors provide a high degree of stability and are well known in the art.

I claim:

1. In a signalling system in combination with an element at one point movable in either of two directions, a reactance associated with said movable element to be varied to change in value in like sense on movement of the element in either direction, wave energy producing means arranged to operate at a first frequency and to change in frequency of operation on movement of said element in either direction, and means for producing indications of said movement at a second point including a receiver tuned to pass wave energy of a fixed frequency slightly different than said first frequency, means in said receiver for modulating current passed thereby in accordance with alternating current of tone frequency, a detector coupled to said last named means, and indicating means excited by the detected current of modulation frequency.

2. In a signalling system in combination with an element at one point movable in either of two directions, a reactance associated with said movable element to be decreased in value in like sense on movement of the element in either direction from a first position, wave energy producing means arranged to operate at a first frequency when said first element is in said first position and to change in frequency of operation in the same sense on movement of said element in either direction, and means for producing indications of said movement at a second point including a receiver tuned to pass wave energy of said first frequency, means in said receiver for modulating current passed thereby in accordance with alternating current of tone frequency, detecting means coupled to said last named means and indicating means responsive to detected currents of tone frequency coupled to said detecting means.

3. In a signalling system in combination with an element at one point movable in either of two directions, a reactance associated with said movable element to increase in value in like sense on movement of the element in either direction, wave energy producing means arranged to operate at a first frequency and to change in frequency of operation in the same sense on movement of said element in either direction, and means for producing indications of said movement at a second point including a receiver tuned to attenuate wave energy of said first frequency, means in said receiver for modulating current passed thereby by alternating current of tone frequency, detecting means coupled to said last named means and indicating means responsive to voltages of tone frequency coupled to said detecting means.

4. In a signalling system in combination with an element at one point used to indicate the condition of apparatus and having a movable member which provides said indication, a reactive element associated with said movable member the reactance of which is varied by movement of said member, means for generating wave energy of a first frequency and means for changing the frequency of generation of said wave energy in accordance with changes in said reactance, means for propagating the generated wave energy to an observation point, a receiver at said last point having a selective radio frequency amplifier adjusted to increasingly attenuate received wave energy as the frequency thereof approaches said first frequency, a frequency converter and first detector having an input coupled to said radio frequency amplifier, a modulated oscillator connected to said converter, means for amplifying current of modulation frequency coupled to said detector and detecting means responsive to current of modulation frequency coupled to said last means.

5. In a signalling system in combination with an element at one point used to indicate the condition of apparatus and having a movable member which provides said indication, a reactive element associated with said movable member the reactance of which is varied by movement thereof, means for generating wave energy of a first frequency and means for changing the frequency of generation of said wave energy in accordance with changes in said reactance, means for propagating the generated wave energy to an observation point, a receiver at said last point having a selective radio frequency amplifier increasingly receptive to wave energy as the frequency thereof deviates from said first frequency, a frequency converter and first detector having an input coupled to said radio frequency amplifier, a modulated oscillator connected to the input of said converter, means for amplifying current of audible frequency coupled to said converter and indicating means responsive to current of audible frequency coupled to said amplifying means.

FREDERIC D. MERRILL, Jr.

REFERENCES CITED

The following references are of record in the file of this patent:

UNITED STATES PATENTS

| Number | Name | Date |
|---|---|---|
| 1,718,497 | St. Clair | June 25, 1929 |
| 1,809,683 | FitzGerald | June 9, 1931 |
| 1,848,490 | McL. Nicolson | Mar. 8, 1932 |
| 1,849,870 | FitzGerald | Mar. 15, 1932 |
| 1,912,213 | McL. Nicolson | May 30, 1933 |
| 2,081,684 | Stoddard | May 25, 1937 |
| 2,144,215 | Beverage | Jan. 17, 1939 |
| 2,395,368 | Bull | Feb. 19, 1946 |